(12) United States Patent
Shemyakina et al.

(10) Patent No.: US 12,131,660 B2
(45) Date of Patent: Oct. 29, 2024

(54) SYSTEMS AND METHODS FOR TEACHING USERS HOW TO READ VIA INTERACTIVE GRAPHICAL USER INTERFACES

(71) Applicant: ROCKIDS COMPANY, Wilmington, DE (US)

(72) Inventors: Olga Shemyakina, Barnaul (RU); Vasilii Baev, Barnaul (RU)

(73) Assignee: ROCKIDS COMPANY, Wilmington, DE (US)

(*) Notice: Subject to any disclaimer, the term of this patent is extended or adjusted under 35 U.S.C. 154(b) by 10 days.

(21) Appl. No.: 17/982,369

(22) Filed: Nov. 7, 2022

(65) Prior Publication Data

US 2023/0154352 A1 May 18, 2023

Related U.S. Application Data

(60) Provisional application No. 63/279,000, filed on Nov. 12, 2021.

(51) Int. Cl.
*G09B 17/00* (2006.01)
*G06F 3/0481* (2022.01)
*G06F 3/0488* (2022.01)
*G09B 17/02* (2006.01)

(52) U.S. Cl.
CPC .......... *G09B 17/006* (2013.01); *G09B 17/02* (2013.01); *G06F 3/0481* (2013.01); *G06F 3/0488* (2013.01)

(58) Field of Classification Search
CPC ..... G09B 17/006; G09B 17/02; G06F 3/0481; G06F 3/0488
See application file for complete search history.

(56) References Cited

U.S. PATENT DOCUMENTS

| | | | |
|---|---|---|---|
| 9,280,906 B2* | 3/2016 | Arora | G09B 5/06 |
| 9,478,143 B1* | 10/2016 | Bowen | G09B 5/062 |
| 11,526,654 B2* | 12/2022 | Seward | G06F 40/109 |
| 2015/0179085 A1* | 6/2015 | Ruyter | G09B 5/06 434/157 |
| 2015/0347364 A1* | 12/2015 | Zhang | G06F 3/04883 715/802 |
| 2016/0307453 A1* | 10/2016 | Pemba | G09B 5/065 |
| 2021/0027008 A1* | 1/2021 | Seward | G06F 40/109 |

(Continued)

*Primary Examiner* — Xuan M Thai
*Assistant Examiner* — Sadaruz Zaman
(74) *Attorney, Agent, or Firm* — Fitch Even Tabin & Flannery, LLP

(57) ABSTRACT

The computer system displays a user interface that represents text information by an improved method of phonics-based approach for teaching reading, especially for those with dyslexia or other neurological disorders. The interface enlarges a line of text to be read by a user and places the cursor/pointer under the first word in the line of text in a direction of reading on the computer screen. The user interacts with the interface by a cursor/pointer. The system calculates the cursor/pointer position and highlights font and background of the traversed part of the text line/element under which the cursor is located. The elements can be letters, syllables and words. In the voiceover mode, the pointer/cursor moves automatically and the user follows the cursor/pointer at the speed suggested by the system and the system voices the word/syllable being read. In the non-voiceover mode, the user drags the cursor along the text line.

20 Claims, 14 Drawing Sheets

(56) References Cited

U.S. PATENT DOCUMENTS

| | | | | |
|---|---|---|---|---|
| 2021/0241647 A1* | 8/2021 | Nagai | .................... | G06F 3/0483 |
| 2023/0112906 A1* | 4/2023 | Seward | ................ | G09B 17/003 |
| | | | | 704/9 |

* cited by examiner

SYSTEMS AND METHODS FOR TEACHING USERS HOW TO READ VIA INTERACTIVE GRAPHICAL USER INTERFACES

CROSS-REFERENCE TO RELATED APPLICATIONS

This application claims the benefit of U.S. provisional application No. 63/279,000, filed Nov. 12, 2021, the contents of which are fully incorporated by reference herein.

TECHNICAL FIELD

This disclosure relates generally to computer systems with a display, including but not limited to electronic devices for education and, more particularly, to education of persons with learning disabilities.

BACKGROUND

Generally speaking, almost two thirds of the fourth-graders in the United States read below proficiency, i.e., below grade level reading and competency required to master difficult, grade level material. Half of these students reading below proficiency levels do not even read at the basic level and they cannot read fourth grade material.

In addition, it is estimated that between 5 and 12 percent of children in the United States have dyslexia, just 4.5 percent of students in public schools are diagnosed with a "specific learning disability," a category that includes dyslexia and other learning disabilities. Moreover, most students who are diagnosed with dyslexia aren't identified until at least third grade.

What is well known about dyslexia is: (1) there is a strong genetic component to dyslexia, but it is not a disorder of a specific gene; (2) dyslexia is caused by a difference in brain organization and it is exhibited by difficulties in reading and spelling against a normal or superior level of intelligence. Those with dyslexia have a problem with phonological decoding of text; and (3) dyslexia can lead to other problems, such as: poor short-term memory, problems with self-organization, and planning. Learning difficulties lead to stress and depression.

Dyslexia may be an epigenetic response to environmental conditions. It may be assumed that the human brain uses dyslexia to adapt to the current level of information flow. This is the way to adapt our brains to process more information at a higher speed.

However, these differences make dyslexics so good at holistic visual-spatial processing. They can see the entire picture. They are creative. It is well known that many successful businessmen and celebrities have dyslexia. But it is needed to minimize the negative consequences of dyslexia to help children become successful A scientifically proven method of teaching reading is the Phonics approach. If children learn to read with Phonics, they do better in school, even in math. It's more significant for children with dyslexia. More than 70% of dyslexic kids become good readers after the intervention.

Reading issues affected by dyslexia or attention-deficit hyperactivity disorder (ADHD) is well corrected in the early stages of development, up to 6 years. But specialists can officially diagnose dyslexia no earlier than 8-10 years. And this is the main problem. This means that the child will receive professional help too late and require a special teacher, books and handouts, time and money. Meanwhile, 20% of people experience the consequences of dyslexia. That number doubled in the last decade and continues to grow.

Teaching a child to read at an early age significantly reduces or totally removes the effects of dyslexia. At this age, the brain has a phenomenal neuroplasticity, and the work of non-functioning areas of the brain due to dyslexia, take over neighboring areas. If a child doesn't have dyslexia, they get a huge boost in learning reading.

SUMMARY

The present application describes systems, methods and graphical user interfaces for teaching reading using a phonics-based approach with fine motor skills engagement for improving learning of users with dyslexia or other neurological disorders of the autistic spectrum.

Reading is an important puzzle piece to a fulfilled life. But 10% of the world's population is still illiterate. More than 30 million Americans cannot read or write above a third-grade level. 63% of all US twelfth-grades are unable to read proficiently. And 30% of them can't read even on a base level. This also includes people with dyslexia reading issues. And the main problem with dyslexia is that dyslexia diagnosed too late for effective treatment. While dyslexia is well known and characterized, the situation is also getting worse. Otherwise, early literacy intervention is proven effective for reading disabilities. Unfortunately, the modern education system has no option to solve a problem before it has been manifested.

The presented interactive graphical interfaces are accessible from age of 2 and make early intervention as much as possible. Prevention is better than cure. The methods are based on amazing brain neuroplasticity at an early age as dyslexia is a different form of brain connections. But the human brain is very flexible. Up to three years, over 2,000,000 synapses are formed in the brain every second. The brain can redistribute functions between areas and recreate broken connections. And the first years of life are the best time for this process. After three, removing unused links begins. It is called Synaptic pruning.

Due to this, children also gain the ability to speak. However, if children don't hear speech during the first three years of their life, they'll never learn to speak. And for kids with dyslexia, this age is crucial for learning to read. If we put a baby in a surrounding where people are talking, the child will learn to speak naturally. But it won't work with reading. If we put a child in a library, he can't learn to read on his/her own. The interactive graphical interfaces described herein turn any book into a naturally teaching reading book.

The presented methods and interfaces are based on fine motor skills to make learning more effective. Fine motor skills involve the largest part of the brain. The frontal lobe becomes a driver for creating new connections for reading. It's like fitness. One needs to make one's largest muscle group work to pump the small ones.

The methods and interfaces improve the key strategies of the Phonics approach, which is the only proven effective technique for teaching reading, especially for struggling readers. In the classical Phonics approach, the interventions are presented separately and the child needs to make efforts to link them together to understand the meaning. Thanks to the interactive graphical interfaces described herein, the interventions work harmoniously and together to achieve an understanding of the syntax and semantics of the reading word.

So, in the voice-overing by syllables mode, three interventions are involved and improved: syllables, blending and Elkonin sound boxes. This allows a user not just to disassemble words into parts, but to understand how letters encode the sound, how words are similar and how these parts connect and sound together.

The invention works like a reading simulator for kids that teaches how to read and prevents reading issues affected by ADHD, dyslexia or other neurological disorders. This is similar to bicycle training wheels, but for reading skill. And if a kid has dyslexia risks, the interactive graphical interfaces described herein effectively prevent reading issues in the future.

In some embodiments, a system for facilitating reading includes an electronic device including a display screen and a programmable processor configured to generate a graphical interface on the display screen of the electronic device, the display screen being a touch screen, the graphical interface including: a line of text to be read next by the user, the line of text to be read next by the user containing at least one syllable; a first interactive graphical element representing a cursor or pointer configured to be movable by a finger of the user along the line of text to be read next by the user; wherein, during movement of the cursor or pointer by the finger of the user along the at least one syllable contained in the line of text to be read next by the user, the electronic device generates an audio output to the user corresponding to the at least one syllable.

The graphical interface may further display at least one line of text previously read by the user and at least one line of text to be read after the line of text to be read next by the user, wherein the line of text to be read next by the user is displayed in larger size font relative to the at least one line of text previously read by the user and the at least one line of text to be read after the line of text to be read next by the user.

The graphical interface may further display the at least one line of text previously read by the user with a highlight overlay indicating to the user that the at least one line of text was previously read by the user. During movement of the cursor or pointer by the finger of the user along the at least one syllable contained in the line of text to be read next by the user, graphical interface generates a first static background color that covers the at least one syllable and a second dynamic background color that moves across the at least one syllable in sync with the movement of the cursor or pointer across the at least one syllable and in sync with the generation of the audio output by the electronic device corresponding to the at least one syllable.

The graphical interface may include a second graphical element representing a forward navigation button that enables the suer to advance to a screen displaying another line of text to be read next by the user, and a third graphical element representing a backward navigation button that enables the user to go back to a screen displaying a line of text previously read by the user. The graphical interface may include a fourth graphical element representing a sound toggle button that permits the user to turn the audio output by the electronic device on and off.

The cursor or pointer may be located below the line of text to be read next by the user, and wherein the cursor or pointer is configured as an image of an object that is age-appropriate for the user.

In some embodiments, a method of facilitating reading includes: generating, on a touch display screen of an electronic device including a programmable processor, a graphical interface, the graphical interface including: a line of text to be read next by the user, the line of text to be read next by the user containing at least one syllable; a first interactive graphical element representing a cursor or pointer configured to be movable by a finger of the user along the line of text to be read next by the user; in response to movement of the cursor or pointer by the finger of the user along the at least one syllable contained in the line of text to be read next by the user, generating, via a speaker of the electronic device, an audio output to the user corresponding to the at least one syllable.

In some embodiments, a non-transitory medium holding computing-device executable instructions for facilitating a user of an electronic device to read text displayed on a display screen of the electronic device, the instructions when executed causing at least one computing device to generate a graphical interface on the display screen of the electronic device, the display screen being a touch screen, the graphical interface including: a line of text to be read next by the user, the line of text to be read next by the user containing at least one syllable; a first interactive graphical element representing a cursor or pointer configured to be movable by a finger of the user along the line of text to be read next by the user; wherein, during movement of the cursor or pointer by the finger of the user along the at least one syllable contained in the line of text to be read next by the user, the electronic device generates an audio output to the user corresponding to the at least one syllable.

DETAILED DESCRIPTION

Figure 1:
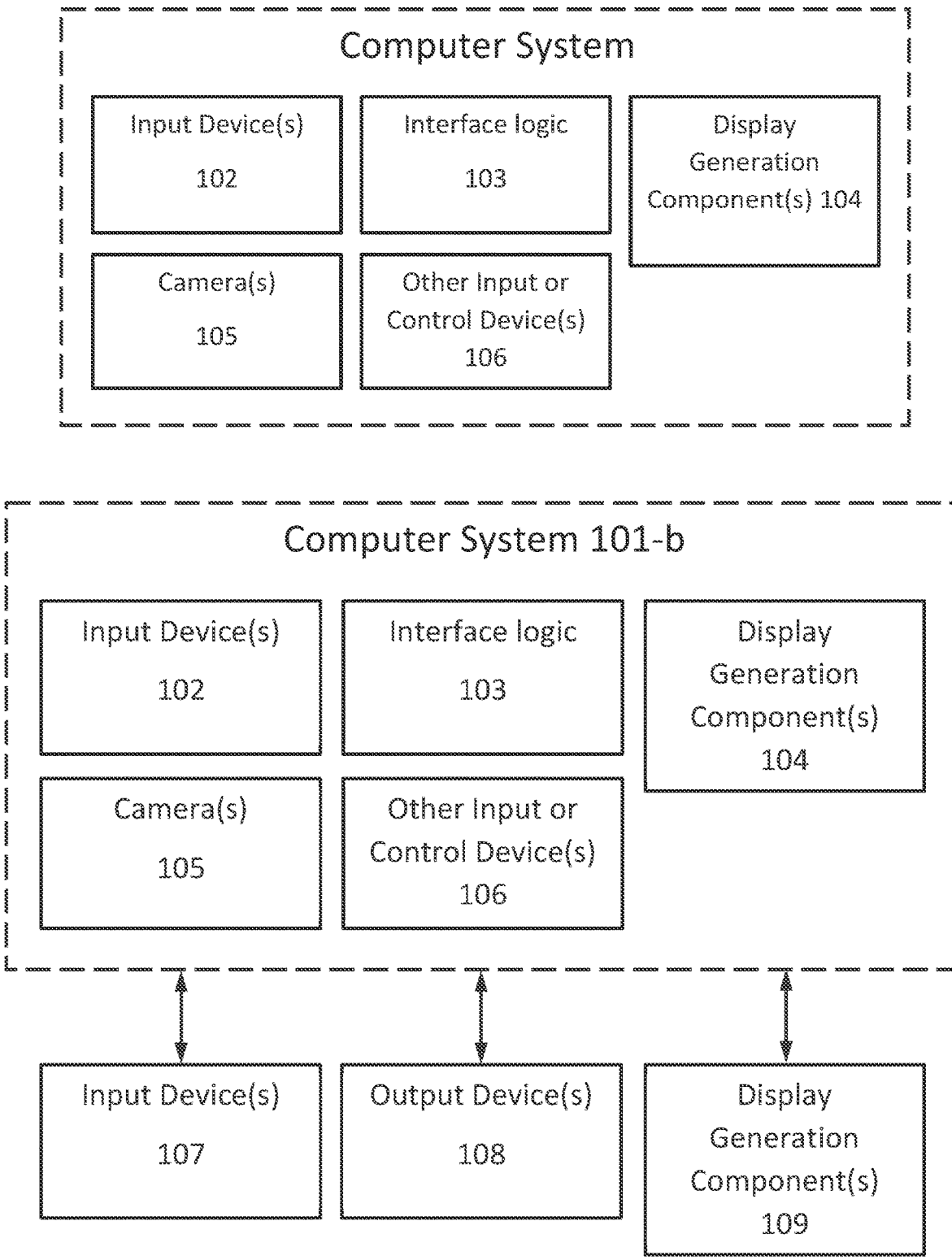
FIG. 1 are block diagrams of example computer systems in accordance with some embodiments.

As mentioned above, there are problems in teaching reading in existing approaches and methods in the education system. The situation is amplified by an increase in the number of people with neurological disorders such as dyslexia and ADHD, the consequences of which are problems with reading. Although early literacy intervention can significantly reduce reading issues or totally remove it, it's not regular practice. Early literacy intervention requires a special teacher, books and handouts, time and money. Moreover, specialists can officially diagnose dyslexia no earlier than 8-10 years. And this means that the child will receive professional help too late.

The systems, methods and interactive graphical user interfaces described herein improve phonics-based approach interventions and makes them accessible from early age.

Embodiments of the invention will be described more fully hereinafter with reference to the accompanying drawings, in which embodiments of the invention are shown. This invention may, however be embodied in many different forms and should not be construed as limited to the embodiments set forth herein; rather, these embodiments are provided so that this disclosure will be thorough and complete, and will fully convey the scope of the invention to those skilled in the art. It will also be understood that, although the terms first, second, etc. are, in some instances, used herein to describe various elements, these elements should not be limited by these terms. These terms are only used to distinguish one element from another. For example, a first text line could be termed a second text line, and, similarly, a second text line could be termed a first text line, without departing from the scope of the various described embodiments. The first text line and the second text line are both text lines, but they are not the same text line, unless the context clearly indicates otherwise.

The terminology used herein in describing exemplary embodiments is for the purpose of describing such embodiments only and is not intended to be limiting. As used in the description of the described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 are block diagrams of exemplary computer systems 101 in accordance with some embodiments. In some embodiments, computer system 101 includes and/or is in communication with: input device(s) (102 and/or 107, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands); the presented Interface logic 103; display generation component(s) (104 and/or 109, e.g., a display, a projector, a head-mounted display, a heads-up display, or the like) for displaying virtual user interface elements to the user; camera(s) (e.g., 105) for capturing images of a field of view of the device, e.g., images that are used to determine placement of virtual user interface elements, determine a pose of the device, and/or display a portion of the physical environment in which the camera(s) are located; and other input or control devices (e.g. 106 and/or 107), for example, pose sensor(s) for determining a pose of the device relative to the physical environment and/or changes in pose of the device. In some computer systems, camera(s) (e.g., 105) include a depth sensor for capturing depth information.

Figure 2:
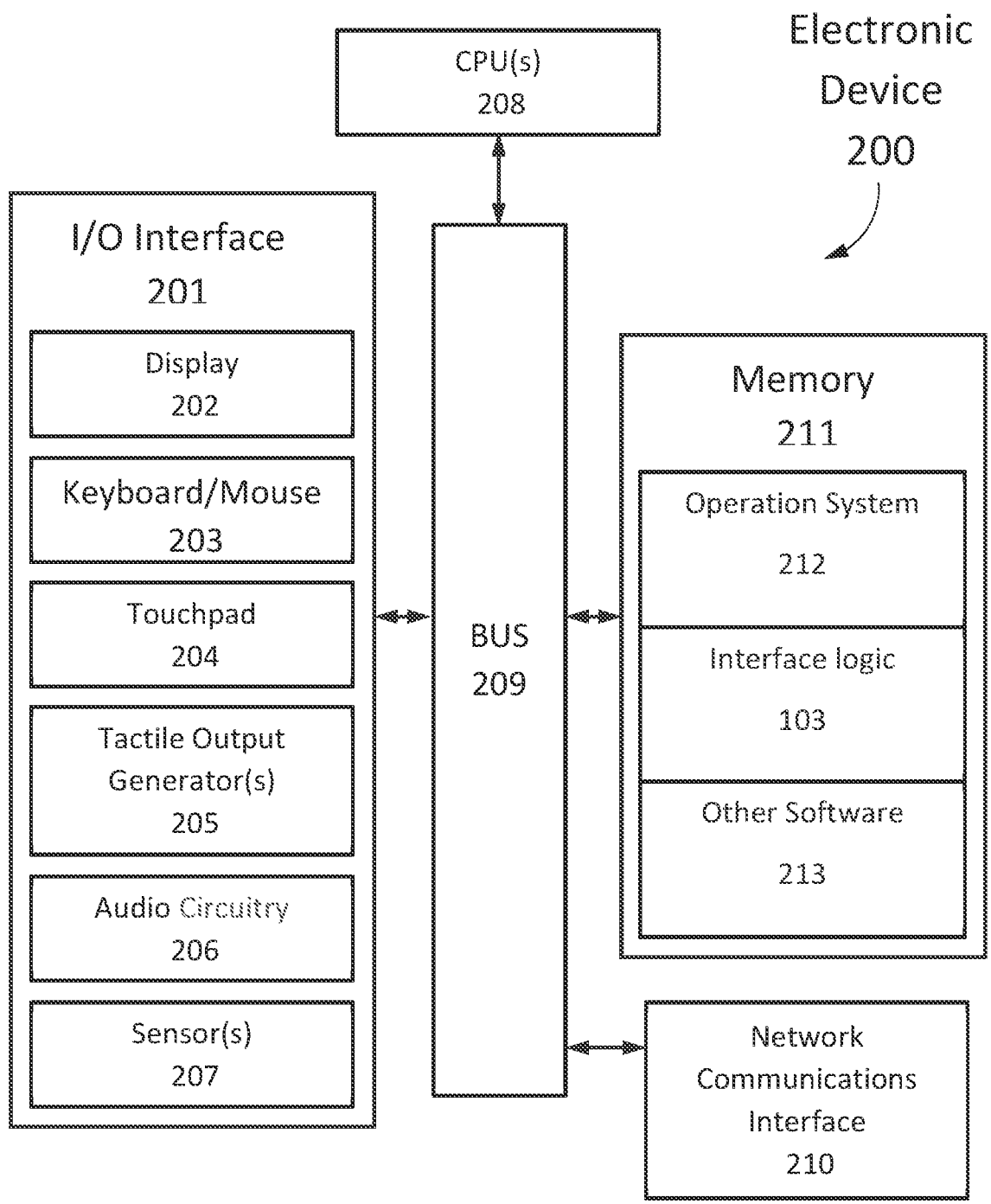
FIG. 2 is a block diagram of an example multifunction electronic device in accordance with some embodiments.
Figure 3:
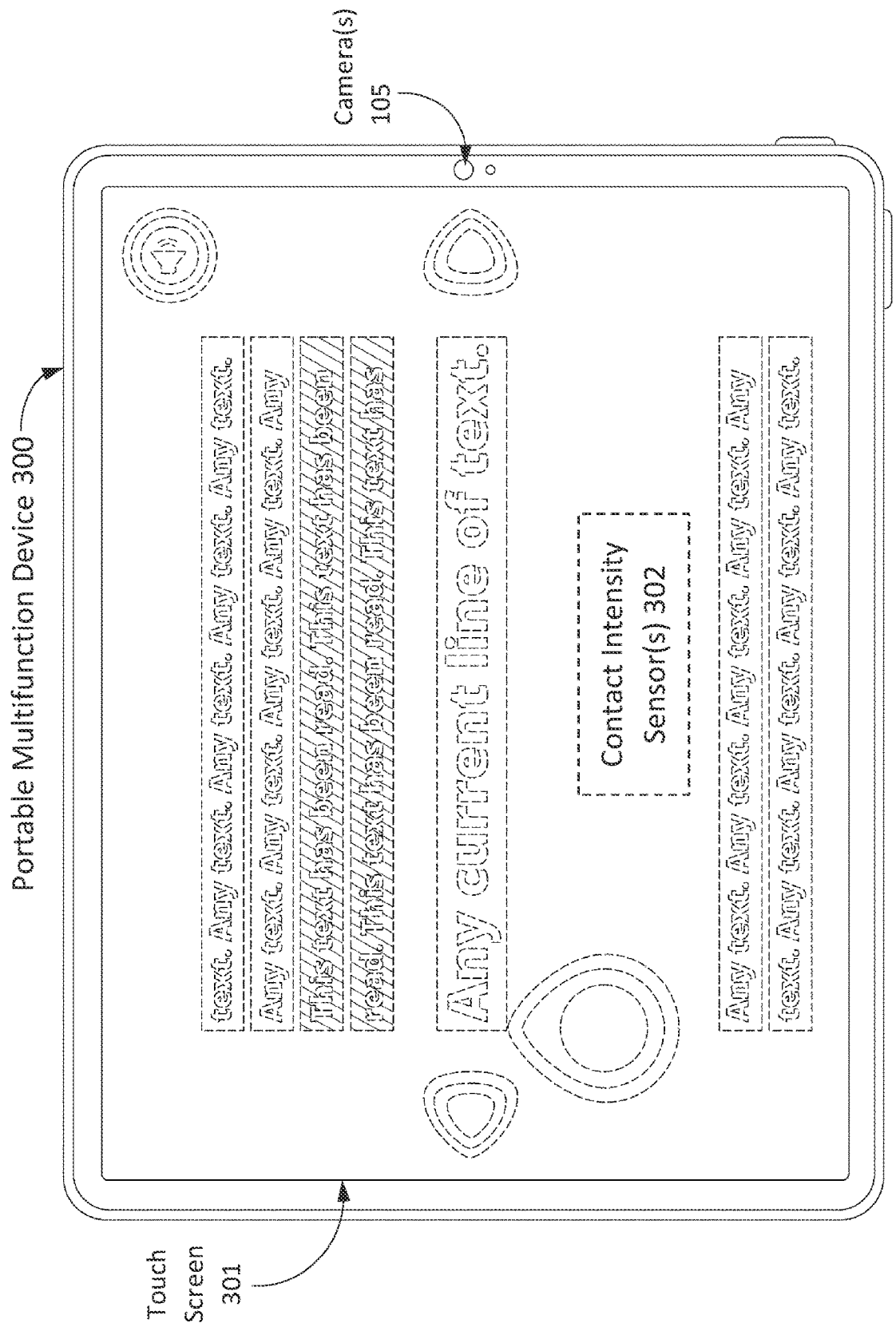
FIG. 3 illustrates a portable multifunction device having a touch screen with a graphical user interface in accordance with some embodiments.

In some computer systems (e.g., 101-a in FIG. 1), input device(s) 102, the presented Interface logic 103, display generation component(s) 104, camera(s) 105; and other input or control device(s) 106 are all integrated into the computer system (e.g., a device such as electronic device 200 in FIG. 2 or portable multifunction device 300 in FIG. 3 such as a smartphone or tablet. An exemplary electronic device 200 as shown in FIG. 2 may include an input/output interface that includes: a display 202, a keyboard/mouse 203, a touchpad 204, a tactile output generator 205, audio circuitry 206, and one or more sensors 207 (e.g., camera, etc.). The electronic device 200 may also include a memory 211 (e.g., a random access memory (RAM), read only memory (ROM), Flash memory, an EEPROM memory, on-chip RAM, optical disk storage, and/or any other medium which may be used to store the desired information and which may be accessed by the programmable central processing unit (also referred to herein as a "control circuit") 208 of the electronic device 200. The exemplary memory 211 shown in FIG. 2 stores data including but not limited to the operation system 212, interface logic 103, and other software 213. The electronic device 200 further includes a network communication interface 210 (which may include a transceiver), which permits the electronic device 200 to communicate with other electronic devices. In the exemplary embodiment illustrated in FIG. 2, the input/output interface 201, control circuit 208, memory 211, and network communications interface 210 are coupled to one another by a bus 209, but may be coupled to one another by other means.

In a portable multifunction device embodiment (e.g., 300 in FIG. 3), the computer system also comprises a touch screen 301 as a display generation component(s) 104 and input device(s) 102, as well as a contact intensity sensor(s) 302 as other input or control device(s) 106.

Figure 4:
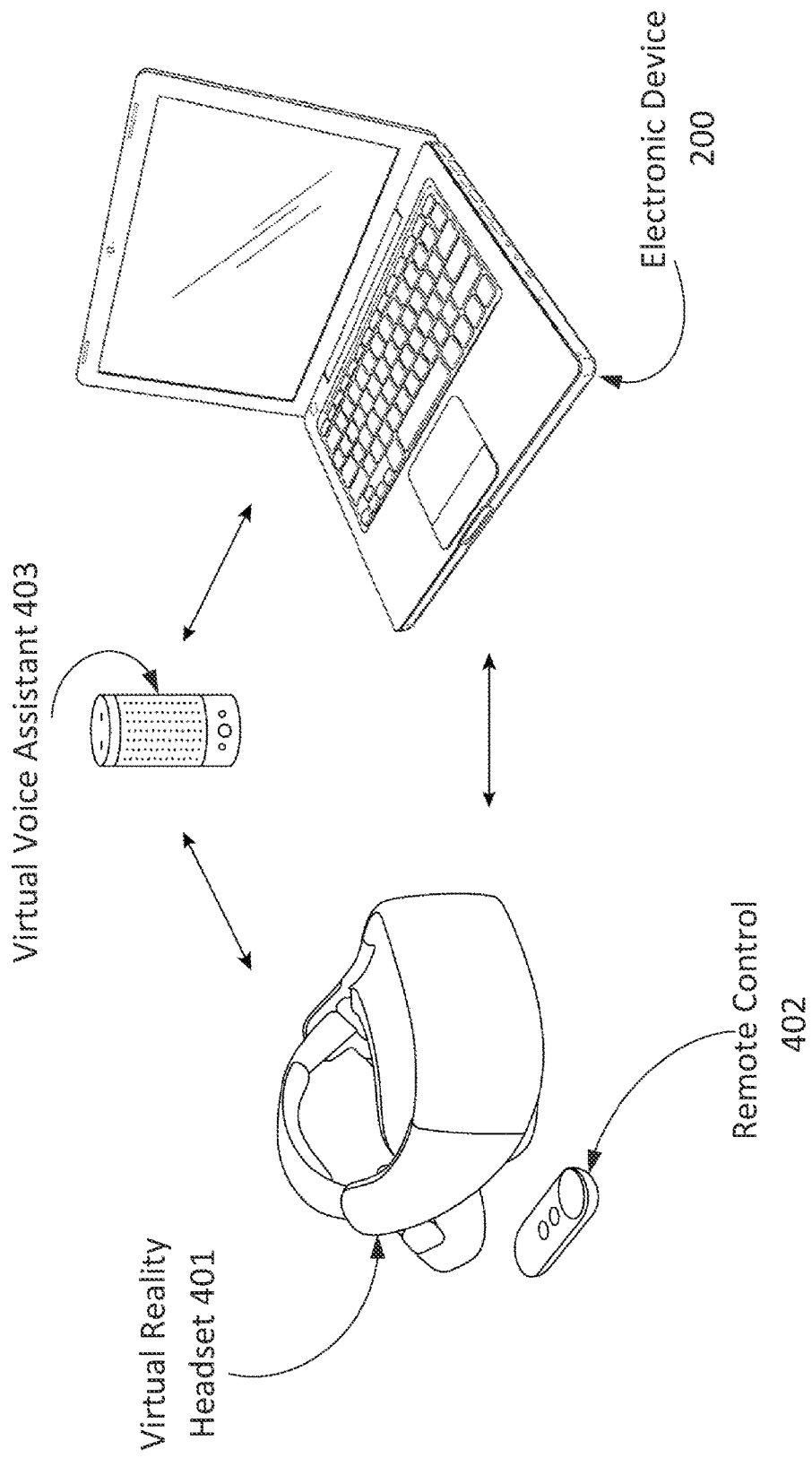
FIG. 4 illustrates a variant of the implementation of a computer system with interface logic and a graphical user interface displayed and functioning on additional devices in accordance with some embodiments.

In some computer systems (e.g., 101-b), in addition to integrated input device(s) 102, the presented interface logic 103, display generation component(s) 104, camera(s) 105, and other input or control devices 106 of electronic device 200, the computer system is also in communication with additional devices that are separate from the computer system, such as separate input device(s) 107 such as a touch-sensitive surface, a wand, a remote control 402, or such as separate output device(s) 108 such as a virtual voice assistant 403, or the like and/or separate display generation component(s) 109 such as a virtual reality headset 401 or augmented reality glasses that overlay virtual objects on a physical environment (e.g., embodiment computer system with additional devices 400 in FIG. 4).

Figure 5:
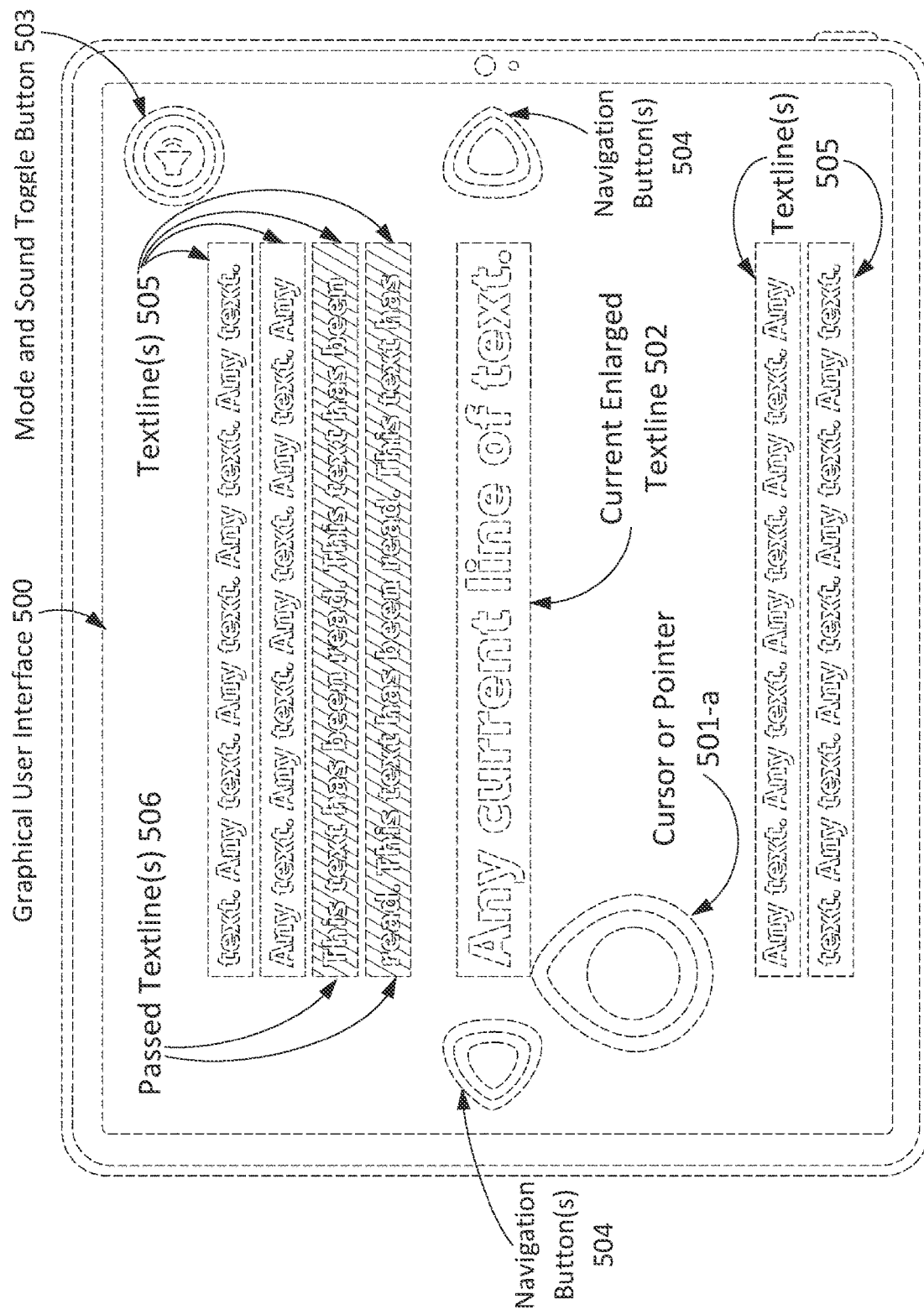
FIG. 5 illustrates an example user interface for a multifunction device with a touch-screen in accordance with some embodiments.

FIG. 5 illustrates an exemplary embodiment of a graphical user interface 500 for a multifunction device with a touch screen in accordance with some embodiments. The interface 500 implements a method of teaching reading based on the use of fine motor skills.

Therefore, a distinctive feature of any embodiment of this interface will be the presence of a cursor or pointer 501-a, through which the user interacts with text in the current enlarged text line 502 and text line(s) 505. In some embodiments, the cursor/pointer may be in the form of an image or an animated sequence (e.g., 501-a in FIG. 3). The main function of the cursor/pointer 501-a, 501-b is to indicate the current position in the text of the current enlarged text line 502.

The current enlarged text line 502 is the second integral part of any embodiment of the interface on a par with the cursor/pointer 501-a, 501-b. The increased size of the current enlarged text line 502 helps to focus on the text contained in it and not be distracted by the rest of the text in other text line(s) 505, especially for users with ADHD and dyslexia.

In some embodiments (e.g. FIG. 5), the interface displays current enlarged text line 502 and the cursor/pointer 501-a, 501-b in context along with additional text line(s) 505. For ease of navigation through the text line(s) 505, the passed text line(s) 506 traversed with the pointer is highlighted with a background color as shown in FIG. 5. This allows the user to separate the text that has already been passed in passed text line(s) 506 and navigate in the context of the entire text contained in text line(s) 505.

The interface embodiment illustrated FIG. 5 also comprises mode and sound toggle button 503, with which the user chooses a learning method with or without voiceover, and navigation button(s) 504 for navigating through pages of text. The ways in which teaching methods work with or without voiceover will be described in detail hereinafter.

FIG. 6-10 illustrate an exemplary embodiment of a user interface for displaying animation and operation of teaching reading methods with voiceovering 600-a and without it 600-b in implementation with text element as syllable.

The main difference between these methods is that in the voiceover method 600-a, the user's goal is to follow the cursor/pointer 501-a, 501-b with his/her finger 507. This method 600-a is used in the initial stages of teaching reading. The effect is based on the activation of the frontal lobes of the brain using fine motor skills, which increases the efficiency of perception of any sensory information. Simultaneously with the movement of the cursor/pointer 501-a, 501-b, the interface highlights the elements of the text above it and voices them. The elements of the text are letters, phonemes in the form of letters encoding them, syllables and words (e.g., in FIG. 6-10 elements are syllables). This helps the user to compare and understand the relationship between letters and phonemes, the sound of phonemes depending on their position in the word, as well as how phonemes form syllables and how words are derived from the syllables. The system offers the user the speed of movement of the cursor/pointer 501-a, 501-b based on the user's age and the history of interaction with the interface. If the user's finger does not keep up with the cursor/pointer 501-a, 501-b, this is considered an error. In case of an error, the pointer is set at the beginning of the element where the error occurred.

For a younger user, or if the user has made a large number of mistakes before, the system offers a slow speed of the cursor/pointer 501-a, 501-b movement. Slow is the speed at which the duration of the voicing of the text element under which the cursor/pointer 501-a, 501-b moves is at least one and a half times shorter than the duration of the passage of this element by the cursor/pointer 501-a, 501-b. The user selects text elements for training depending on the level and stage of training.

The method without voiceover 600-b is used to reinforce the reading skill. After passing the text by the method with voiceover 600-a, the user switches the method using the 503 button to the method without voiceover 600-b. Now, the user drags the cursor/pointer 501-a, 501-b through the text and speaks the elements under which the cursor/pointer 501-a, 501-b passes. The interface, as in the case of the method with voiceover 600-a, also highlights the elements under which the cursor/pointer 501-a, 501-b passes.

In both methods 600-a, 600-b, for additional emphasizing of text elements, in addition to their highlighting, a decrease in the speed of the cursor/pointer 501-a, 501-b movement or its complete stop in places between elements, including punctuation marks and spaces, is provided.

Figure 6:
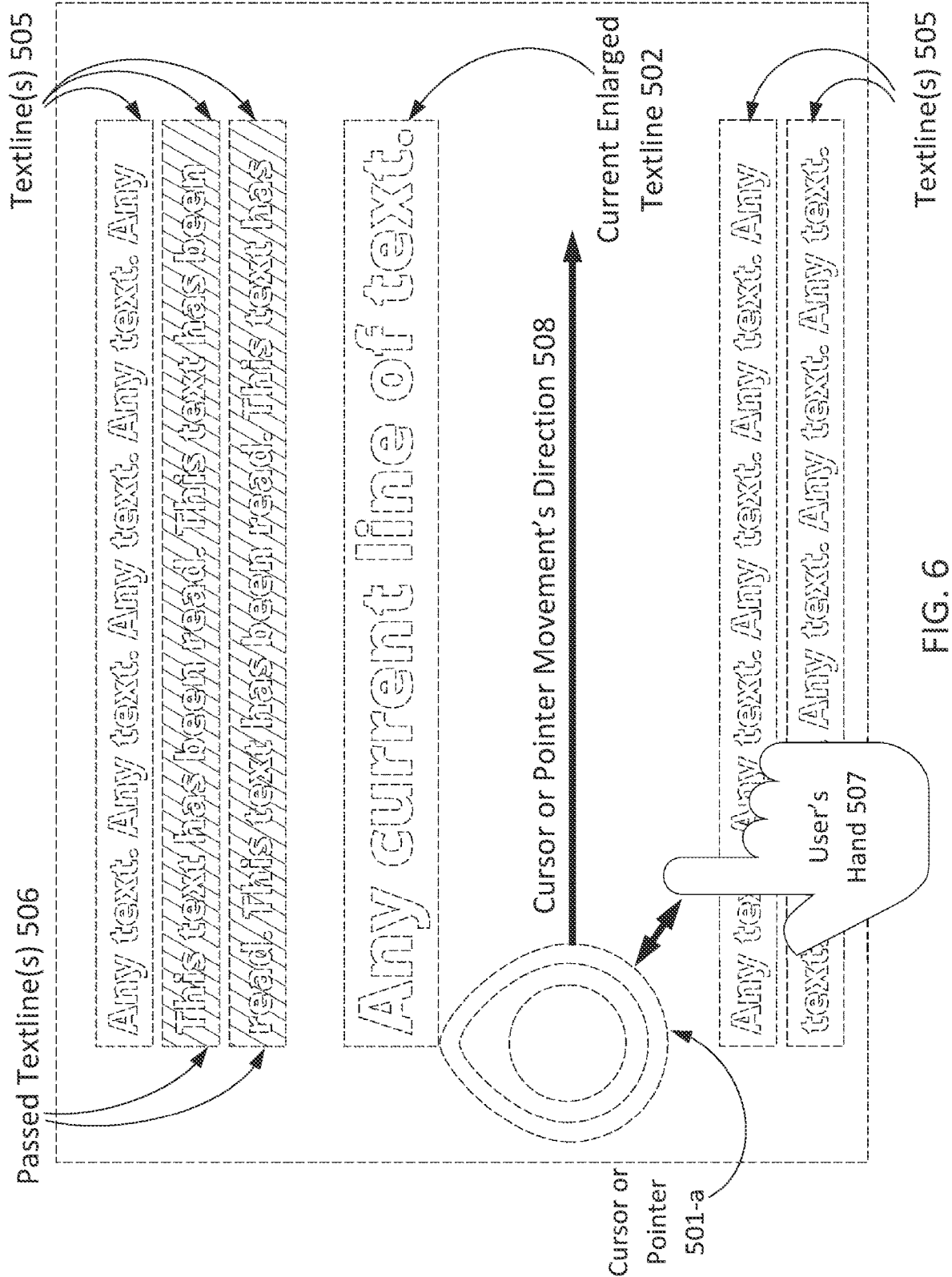
FIG. 6-10 illustrate examples of a user interface for displaying animation and operation of teaching reading methods in accordance with some embodiments.
Figure 11A:
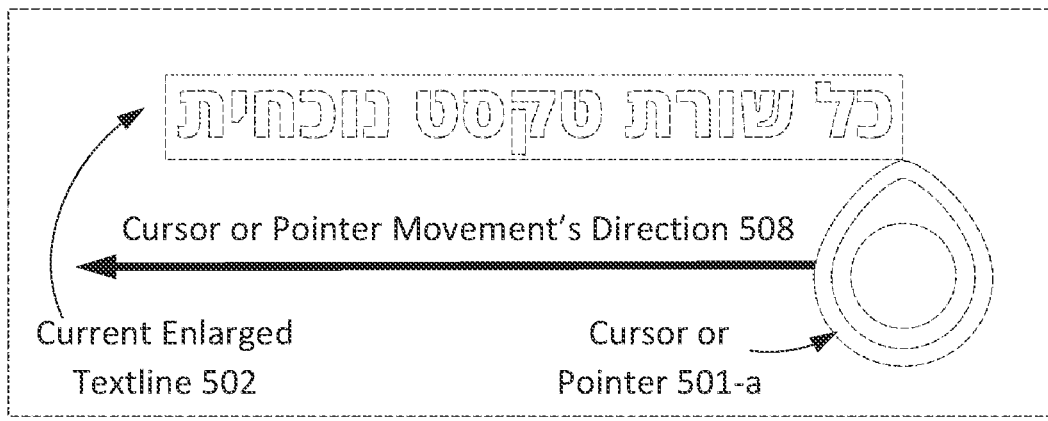
FIG. 11a, 11b, 11c illustrate examples of user interfaces for displaying animation and operation of teaching reading methods in an implementation for a culture with a different direction of reading in accordance with some embodiments.
Figure 11B:
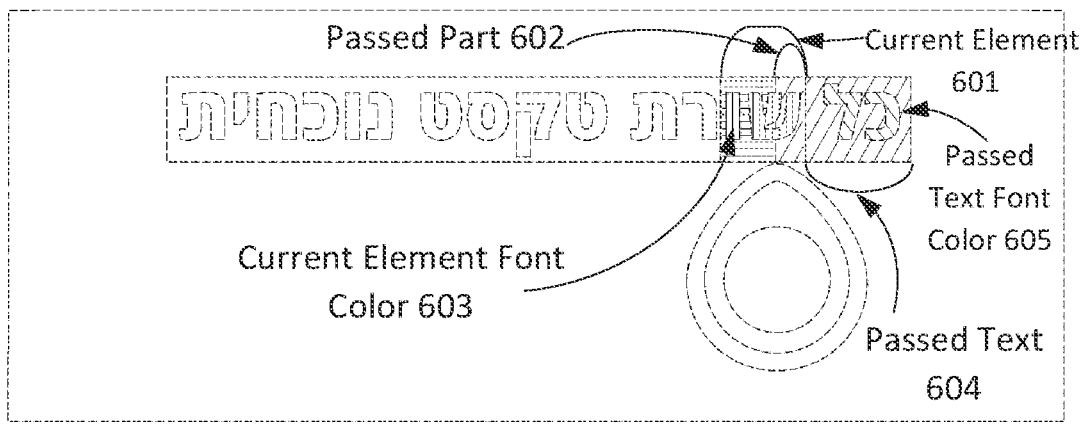
Figure 11C:
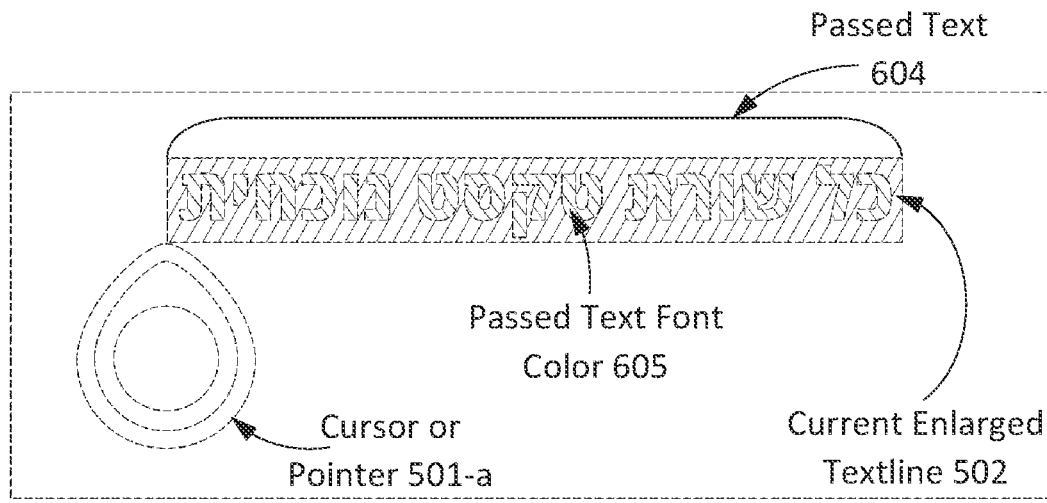
Figure 12A:
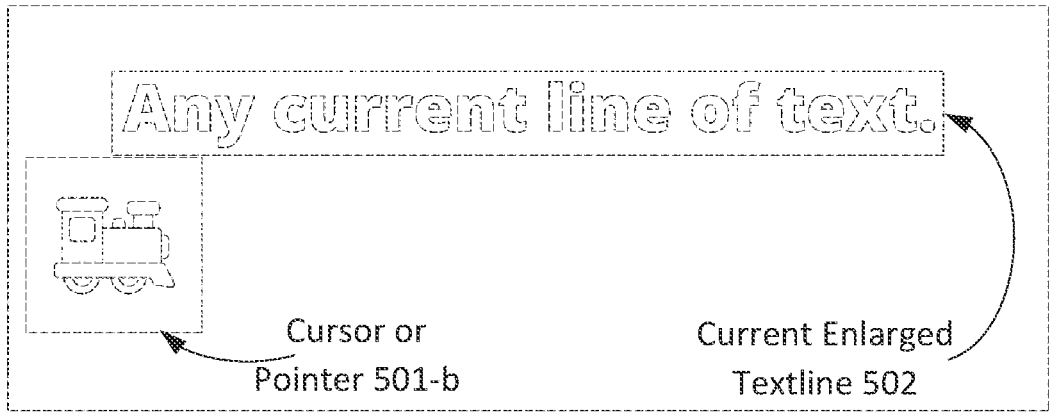
FIG. 12a, 12b, 12c illustrate example of user interfaces for displaying animation and operation of teaching reading methods in an implementation with a different form of a cursor/pointer in accordance with some embodiments.
Figure 12B:
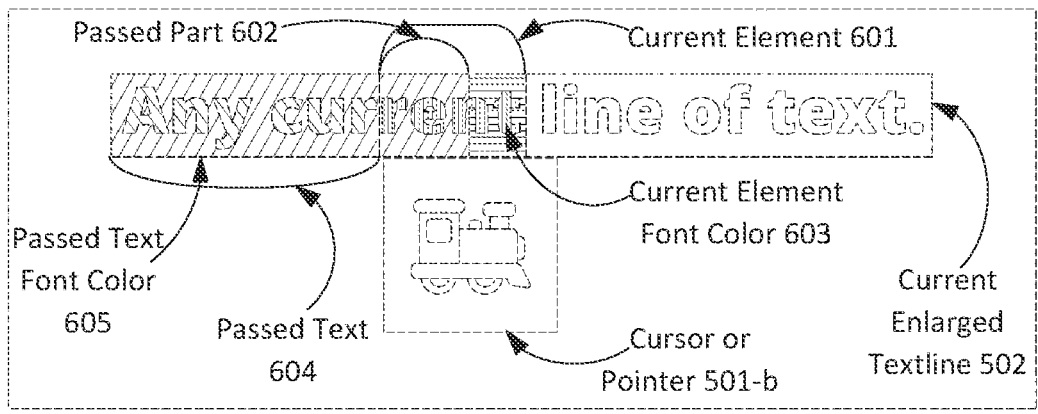
Figure 12C:
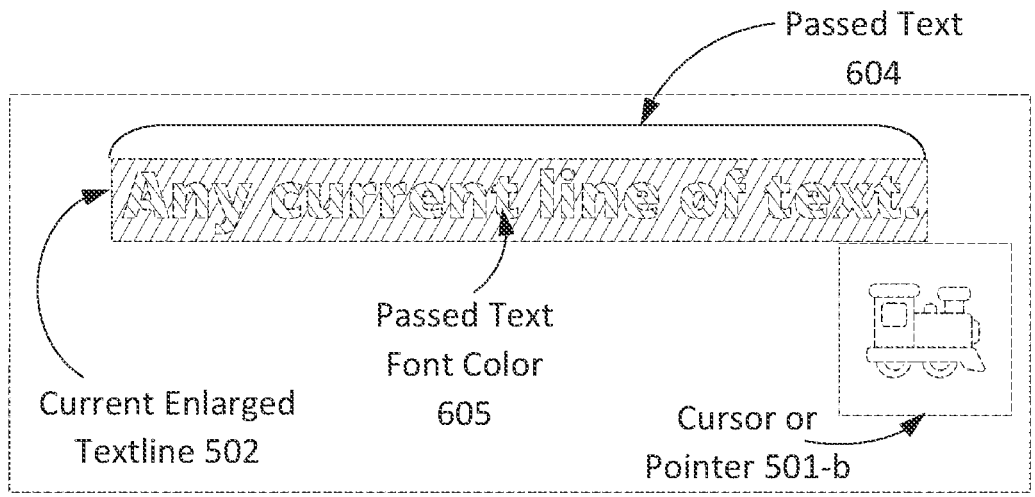

FIG. 6 illustrates an exemplary embodiment of a graphical user interface showing the initial state of the interface animation. The system calculates the current enlarged text line 502 for the user, the interface enlarges it and places the cursor/pointer 501-a under it to the beginning in the direction of movement 508. Depending on the culture, the beginning and direction of movement 508 may differ. For example, FIG. 11a, 11b, 11c illustrate the initial state and reading direction of the interface for the Hebrew language. The user clicks the pointer to start moving cursor/pointer 501-a and animating the methods. After that, the system calculates the first and subsequent text elements of the current line and the interface sequentially highlights them as the pointer moves.

Figure 7:
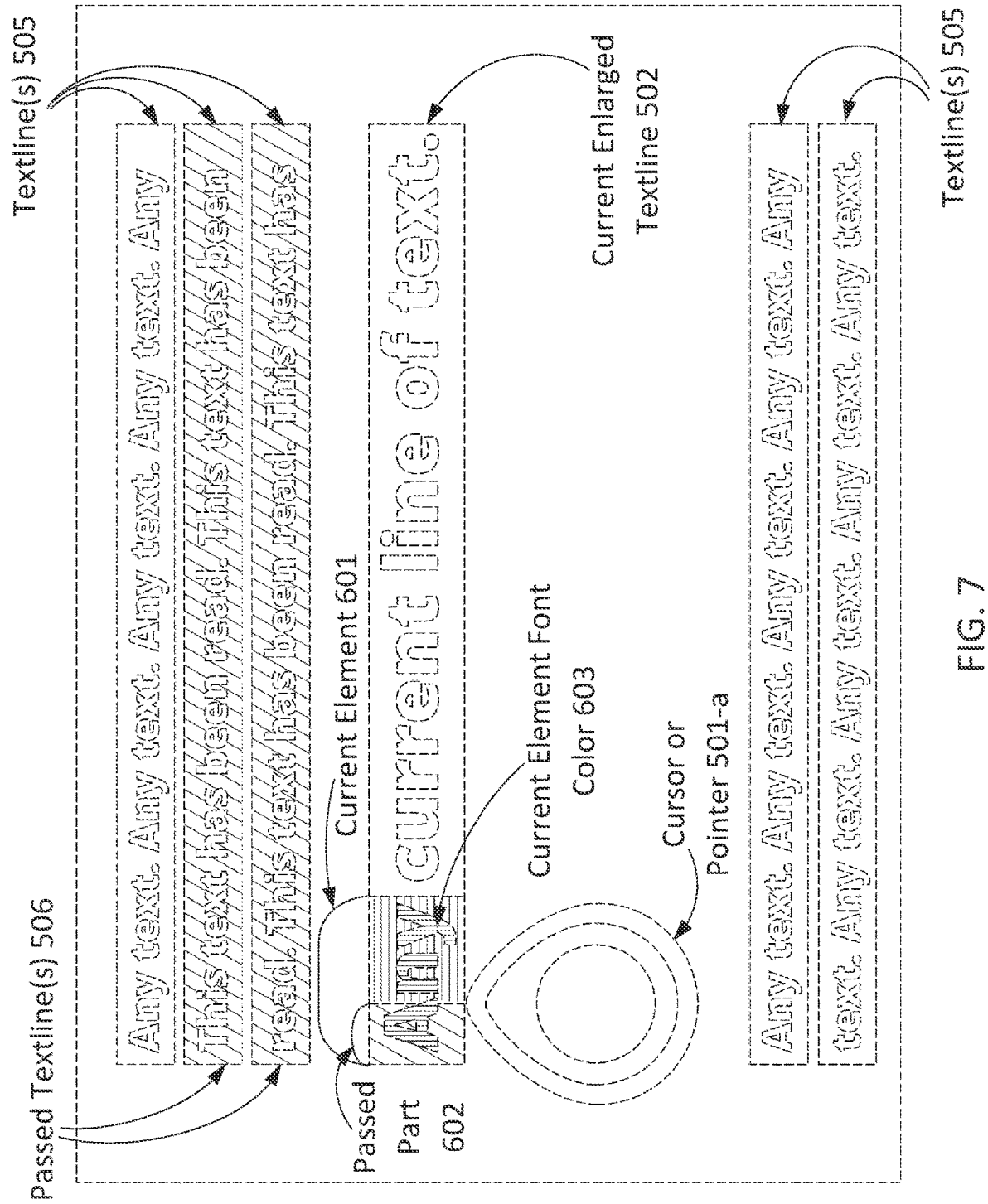

FIG. 7 illustrates an exemplary embodiment of a graphical user interface that shows the beginning of the animation of the method and the highlighting by the interface of the first element of the text from the current enlarged text line 502, in this case the element is a syllable. Immediately after the start of the cursor/pointer 501-a movement, the interface highlights the background of the entire current element 601 (e.g. a syllable in FIG. 7) under which the pointer is located, also highlighting the font color 603 of current element 601. As the cursor/pointer 501-a passes the current element 601, the background of the passed part 602 of the current element 601 is highlighted by the interface in a different color. After the pointer has reached the end of the current element 601, the entire background of the current element 601 is painted in the color of the passed part 602. Next, the system calculates the next text element in this current enlarged text line 502 and the interface highlights it as the current one 601.

Figure 8:
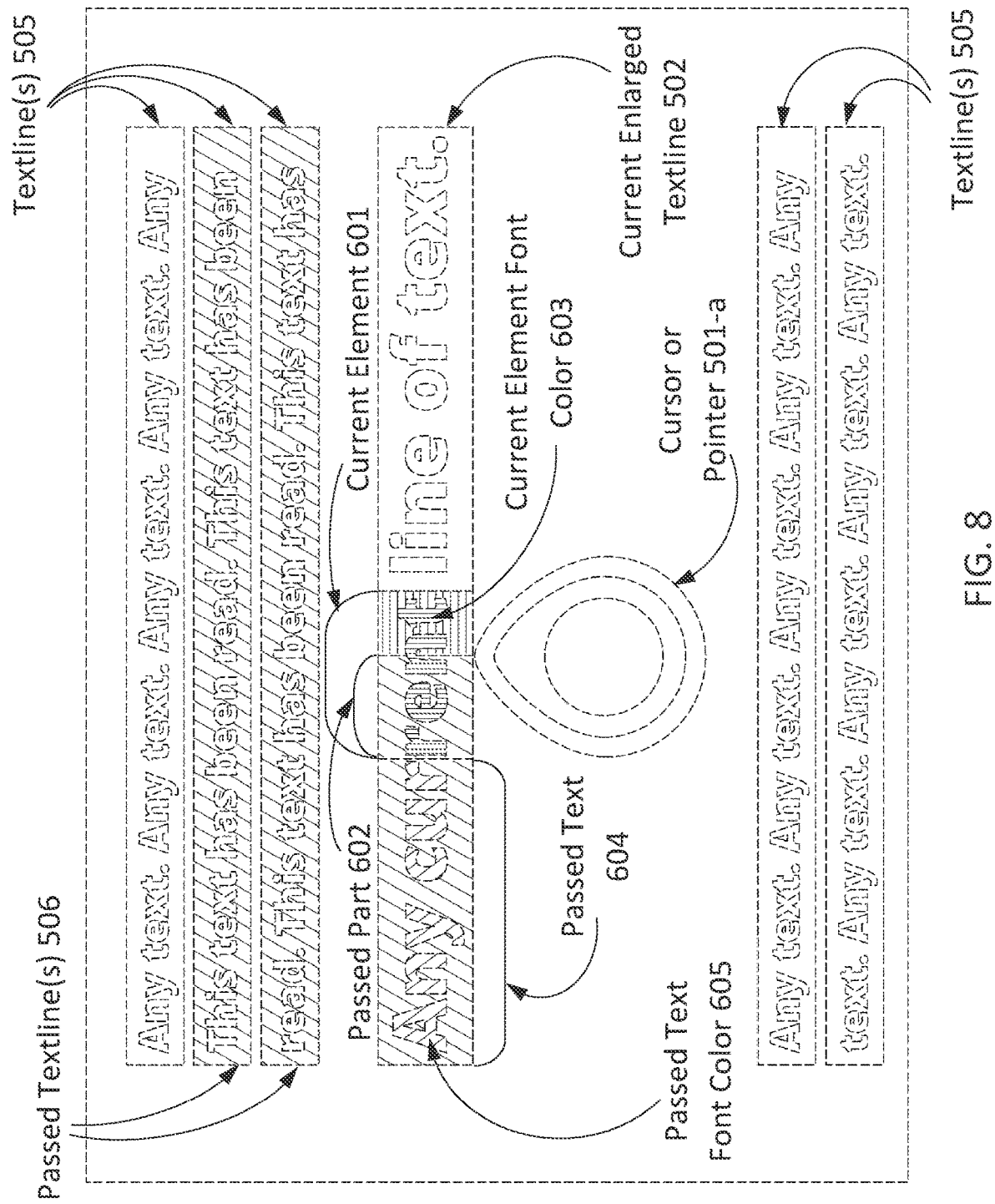

FIG. 8 illustrates an exemplary embodiment of a graphical user interface that shows the animation state of the method after the cursor/pointer 501-a passes through several text elements from the current enlarged text line 502. In the current element 601, the interface highlights the font 603, the background of the entire current element 601 and the background of the part 602 passed by the pointer in the current element in different colors. In addition, the font 605 and background 604 of the passed text are also colored by the interface in different colors. However, the user can choose the same colors for the background of the passed text 604 and the current element 601, 602, as well as for the passed text font 605 and the current element font 603.

Figure 9:
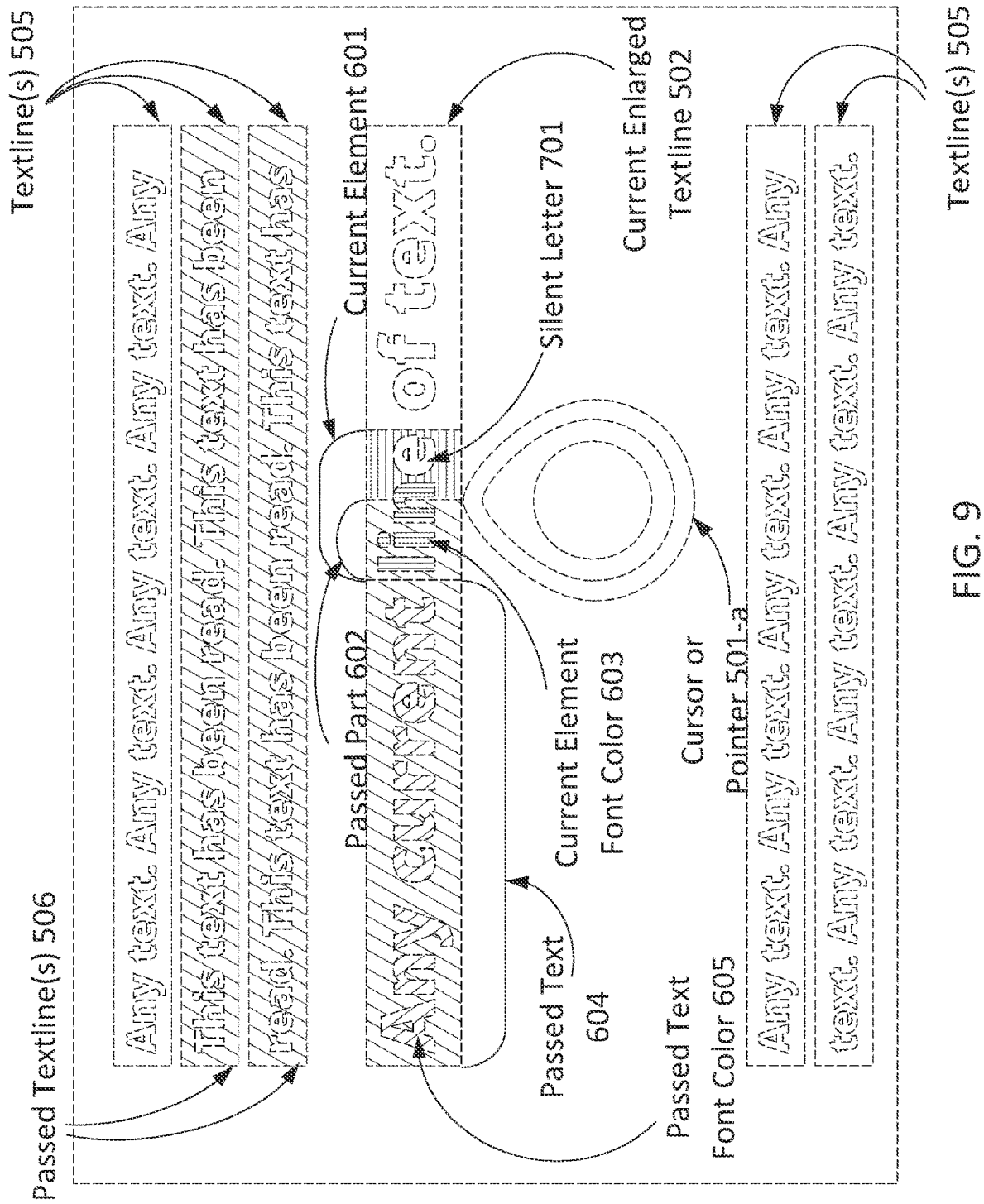
Figure 13A:
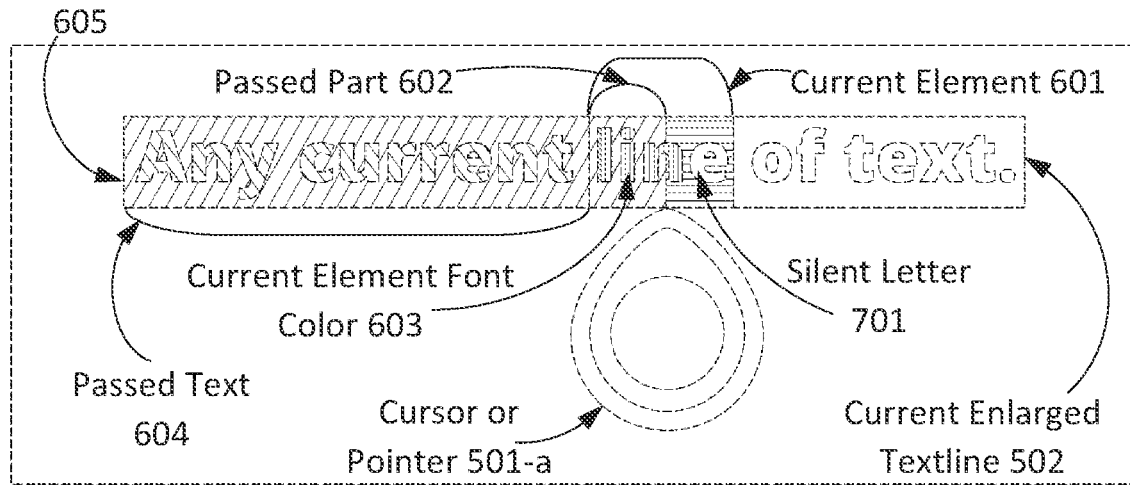
FIG. 13a, 13b illustrate examples of user interfaces for displaying animation and operation of teaching reading methods highlighting silent letters in accordance with some embodiments.
Figure 13B:
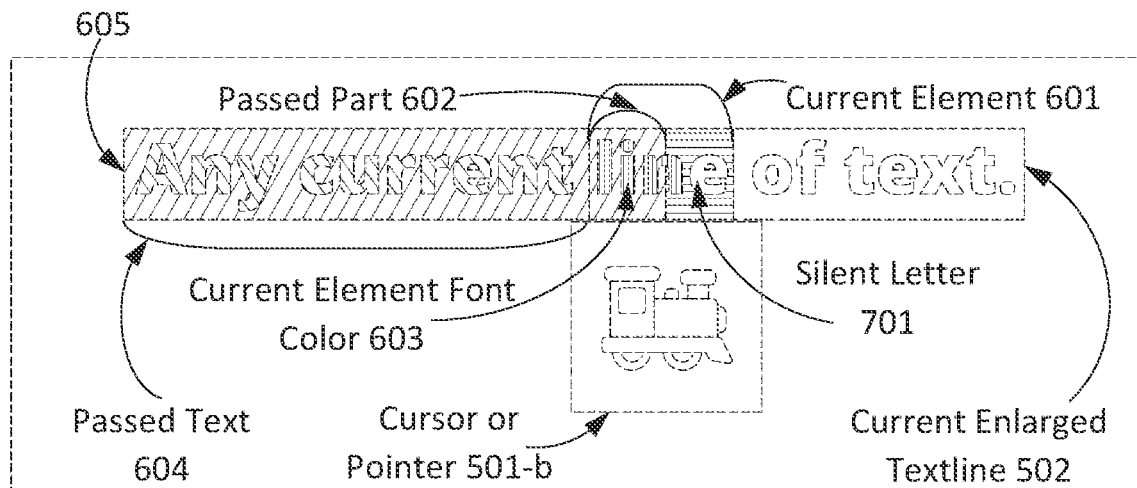

FIG. 9 illustrates an exemplary embodiment of an interactive user interface that provides for highlighting silent letters. Unlike the animation state disclosed above in FIG. 8, there is a silent letter "e" in the current element in FIG. 9. A silent letter is a letter that in a certain word does not correspond to any sound in the pronunciation of the word. Users with dyslexia, ADHD and other autism spectrum disorders have a particular difficulty with such letters. If silent letters are present in the current element 601, the interface strokes the silhouette of silent letters but doesn't print it in font color. After passing the current element 601 containing silent letters, the interface prints the silent letters in the font colors of the passed text 605. FIG. 13a, 13b illustrate an example of embodiment of a user interface for displaying animation and operation of teaching reading methods highlighting silent letters.

Figure 10:
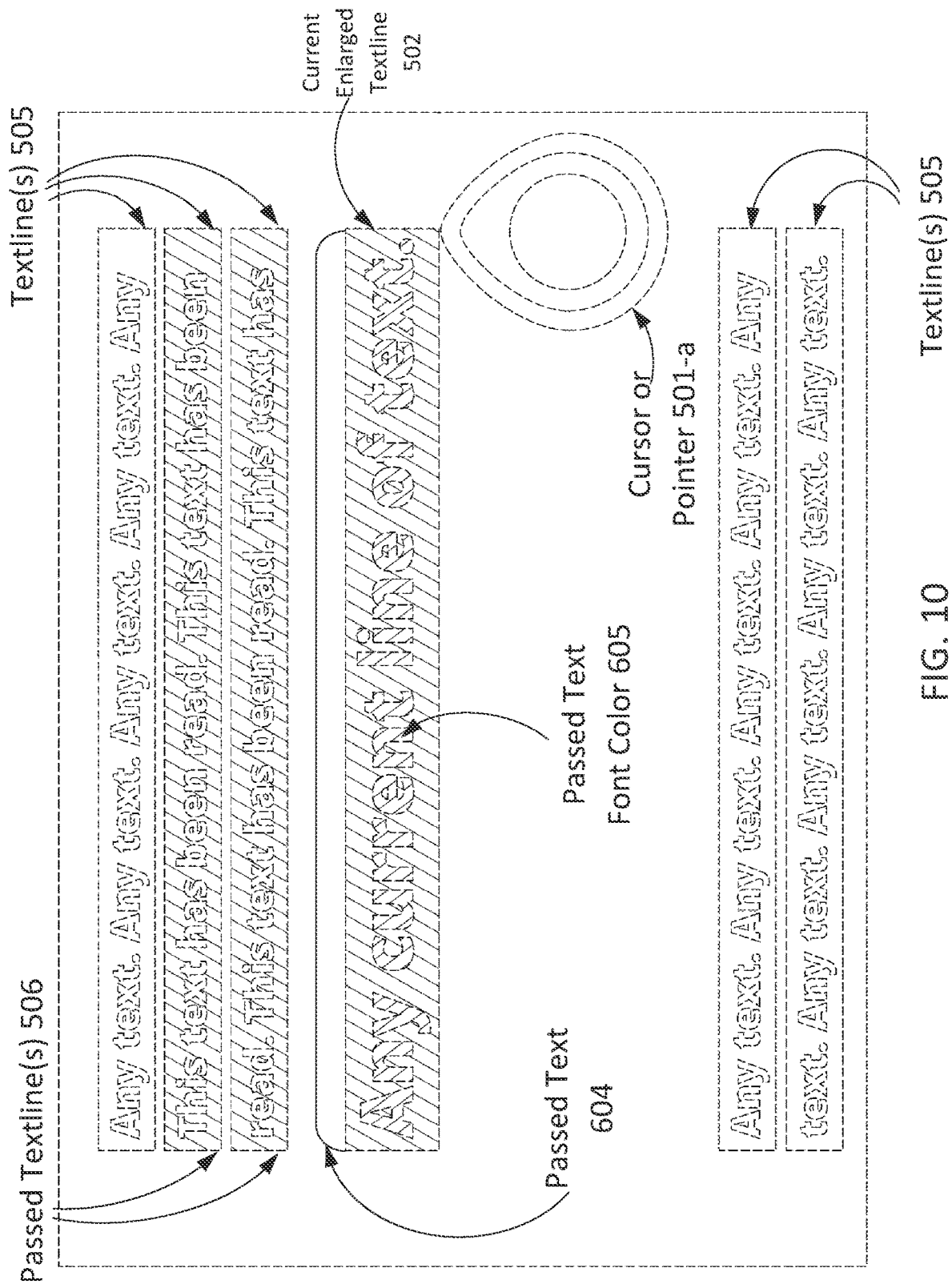

FIG. 10 illustrates an exemplary embodiment of an interactive user interface showing the final state of the interface animation. After reaching the end of the current enlarged text line 502, in some cases, depending on the implementation of the interface, reward triggers may be triggered, for example, showing a video or animating various special effects, for example a firework. The current enlarged text line 502 is marked as passed text line(s) 506. The system calculates the next line to pass through and the interface selects and enlarges it and puts the pointer in the initial state.

Figure 14A:
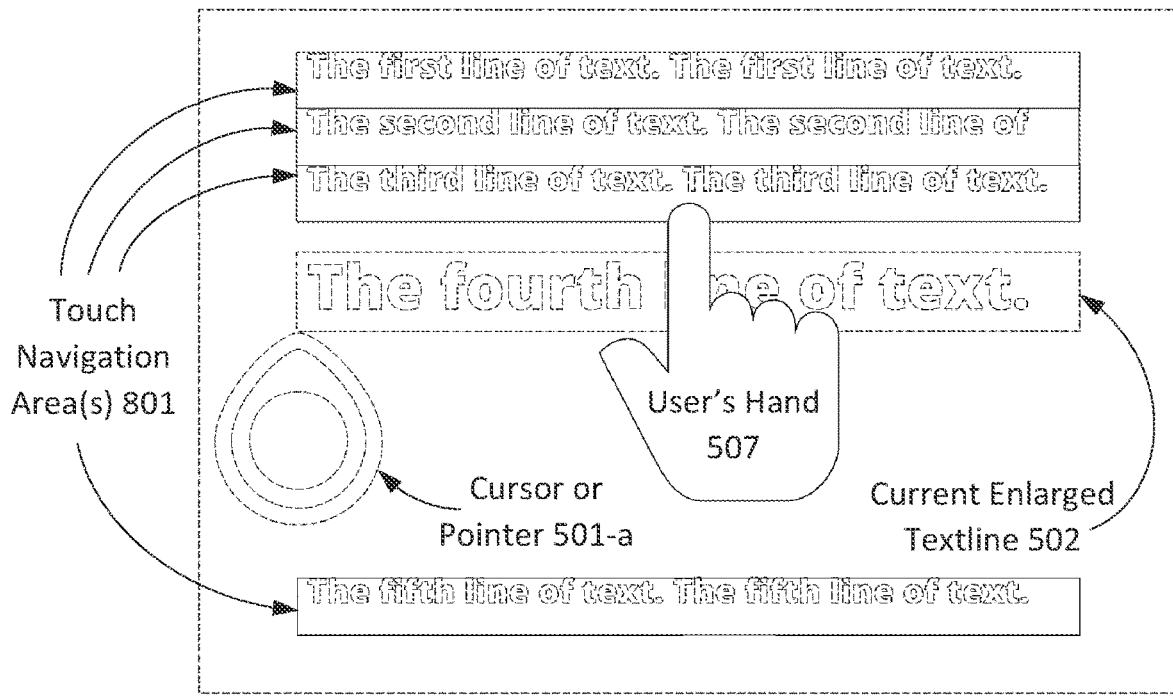
FIGS. 14a, 14b illustrate examples of user interfaced for displaying text navigation within the interfaces in accordance with some embodiments.
Figure 14B:
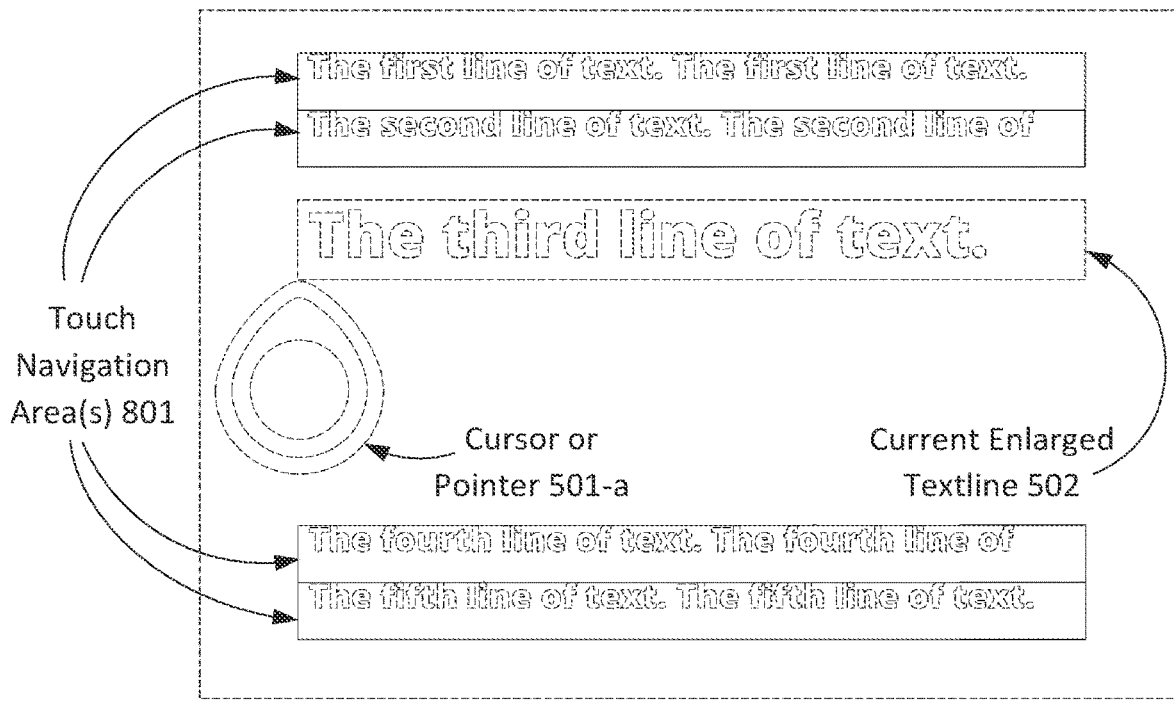

FIG. 14a, 14b illustrate an exemplary embodiment of a user interface for displaying text navigation within this interface, in the case when the user wants to independently select a line to pass. FIG. 14a illustrates the state of the interface at the moment of the user's hand 507 touch. The current enlarged text line 502 with the cursor/pointer 501-a is the fourth line from the top. When the user touches the touch navigation area(s) 801 the interface makes current and enlarges the text line located in the user-selected touch navigation area 801. And also places the cursor/pointer 501-a in the initial position. FIG. 14b illustrates the state of the interface after touch. The current enlarged text line 502 is the 3rd line from the top, which was chosen by the user in FIG. 14a.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A system for facilitating reading, the system comprising:
   an electronic device including a display screen and a programmable processor configured to generate a graphical interface on the display screen of the electronic device, the display screen being a touch screen, the graphical interface including:
      a line of text to be read next by the user, the line of text to be read next by the user containing at least one syllable;
      a first movable button located below the line of text to be read next by the user and representing a cursor or pointer through which the user is permitted to interact with the line of text to be read next by the user, the first movable button configured to:
         move along and below the line of text to be read next by the user in response to a finger of the user contacting and dragging the movable button; or
         automatically move along and below the line of text to be read next by the user so long as the finger of the user is pressed on the movable button and is not released from the movable button;
      wherein, during movement of the movable button along and below the at least one syllable contained in the line of text to be read next by the user, the electronic device generates an audio output to the user corresponding to the at least one syllable below which the movable button is located.

2. The system of claim 1, wherein the graphical interface further displays at least one line of text previously read by the user and at least one line of text to be read after the line of text to be read next by the user, wherein the line of text to be read next by the user is displayed in larger size font relative to the at least one line of text previously read by the user and the at least one line of text to be read after the line of text to be read next by the user.

3. The system of claim 2, wherein the graphical interface further displays the at least one line of text previously read by the user with a highlight overlay indicating to the user that the at least one line of text was previously read by the user.

4. The system of claim 1, wherein, during movement of the movable button along the at least one syllable contained in the line of text to be read next by the user, graphical interface generates a first static background color that covers the at least one syllable and a second dynamic background color that moves across the at least one syllable in sync with the movement of the movable button across the at least one syllable and in sync with the generation of the audio output by the electronic device corresponding to the at least one syllable.

5. The system of claim 1, wherein the graphical interface includes a second graphical element representing a forward navigation button that enables the user to advance to a screen displaying another line of text to be read next by the user, and a third graphical element representing a backward navigation button that enables the user to go back to a screen displaying a line of text previously read by the user.

6. The system of claim 5, wherein the graphical interface includes a fourth graphical element representing a sound toggle button that permits the user to turn the audio output by the electronic device on and off.

7. The system of claim 1, wherein the programmable processor is programmed to interpret a detection that the finger of the user stops pressing or releases the movable button as an error, and to stop the automatic movement of the movable button, and to reset the movable button to a beginning of the at least one syllable where the error was detected.

8. A method of facilitating reading, the method comprising:
   generating, on a touch display screen of an electronic device including a programmable processor, a graphical interface, the graphical interface including:
      a line of text to be read next by the user, the line of text to be read next by the user containing at least one syllable;
      a first movable button located below the line of text to be read next by the user and representing a cursor or pointer through which the user is permitted to interact with the line of text to be read next by the user, the first movable button configured to:
         move along and below the line of text to be read next by the user in response to a finger of the user contacting and dragging the movable button; or
         automatically move along and below the line of text to be read next by the user so long as the finger of the user is pressed on the movable button and is not released from the movable button;
      wherein, during movement of the movable button along and below the at least one syllable contained in the line of text to be read next by the user, the electronic device generates an audio output to the user corresponding to the at least one syllable below which the movable button is located.

9. The method of claim 8, further comprising displaying, in the graphical interface, at least one line of text previously read by the user and at least one line of text to be read after the line of text to be read next by the user, wherein the line of text to be read next by the user is displayed in larger size font relative to the at least one line of text previously read by the user and the at least one line of text to be read after the line of text to be read next by the user.

10. The method of claim 9, further comprising displaying, in the graphical interface, the at least one line of text previously read by the user with a highlight overlay indicating to the user that the at least one line of text was previously read by the user.

11. The method of claim 8, further comprising, during movement of the movable button along the at least one syllable contained in the line of text to be read next by the user, generating in the graphical interface a first static background color that covers the at least one syllable and a second dynamic background color that moves across the at least one syllable in sync with the movement of the movable button across the at least one syllable and in sync with the generation of the audio output by the electronic device corresponding to the at least one syllable.

12. The method of claim 8, wherein the graphical interface includes a second graphical element representing a forward navigation button that enables the user to advance to a screen displaying another line of text to be read next by the user, and a third graphical element representing a backward navigation button that enables the user to go back to a screen displaying a line of text previously read by the user.

13. The method of claim 12, wherein the graphical interface includes a fourth graphical element representing a sound toggle button that permits the user to turn the audio output by the electronic device on and off.

14. The method of claim 8, further comprising, by the programmable processor: interpreting a detection that the finger of the user stops pressing or releases the movable button as an error, stopping the automatic movement of the movable button, and resetting the movable button to a beginning of the at least one syllable where the error was detected.

15. A non-transitory medium holding computing-device executable instructions for facilitating a user of an electronic device to read text displayed on a display screen of the electronic device, the instructions when executed via a programmable processor causing the electronic device to:
generate a graphical interface on the display screen of the electronic device, the display screen being a touch screen, the graphical interface including:
a first movable button located below the line of text to be read next by the user and representing a cursor or pointer through which the user is permitted to interact with the line of text to be read next by the user, the first movable button configured to:
move along and below the line of text to be read next by the user in response to a finger of the user contacting and dragging the movable button; or
automatically move along and below the line of text to be read next by the user so long as the finger of the user is pressed on the movable button and is not released from the movable button;
wherein, during movement of the movable button along and below the at least one syllable contained in the line of text to be read next by the user, the electronic device generates an audio output to the user corresponding to the at least one syllable below which the movable button is located.

16. The non-transitory medium of claim 15, wherein the graphical interface further displays at least one line of text previously read by the user and at least one line of text to be read after the line of text to be read next by the user, wherein the line of text to be read next by the user is displayed in larger size font relative to the at least one line of text previously read by the user and the at least one line of text to be read after the line of text to be read next by the user.

17. The non-transitory medium of claim 16, wherein the graphical interface further displays the at least one line of text previously read by the user with a highlight overlay indicating to the user that the at least one line of text was previously read by the user.

18. The non-transitory medium of claim 15, wherein, during movement of the movable button along the at least one syllable contained in the line of text to be read next by the user, graphical interface generates a first static background color that covers the at least one syllable and a second dynamic background color that moves across the at least one syllable in sync with the movement of the movable button across the at least one syllable and in sync with the generation of the audio output by the electronic device corresponding to the at least one syllable.

19. The non-transitory medium of claim 15, wherein the graphical interface includes a second graphical element representing a forward navigation button that enables the user to advance to a screen displaying another line of text to be read next by the user, and a third graphical element representing a backward navigation button that enables the user to go back to a screen displaying a line of text previously read by the user.

20. The non-transitory medium of claim 19, wherein the programmable processor of the electronic device is programmed to interpret a detection that the finger of the user stops pressing or releases the movable button as an error, and to stop the automatic movement of the movable button, and to reset the movable button to a beginning of the at least one syllable where the error was detected.

* * * * *